United States Patent
Manolakos et al.

(10) Patent No.: US 11,646,851 B2
(45) Date of Patent: May 9, 2023

(54) CHANNEL STATE INFORMATION REPORTING PRIORITIZATION

(71) Applicant: QUALCOMM Incorporated, San Diego, CA (US)

(72) Inventors: Alexandros Manolakos, Escondido, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 16/948,423

(22) Filed: Sep. 17, 2020

(65) Prior Publication Data
US 2021/0091910 A1    Mar. 25, 2021

(30) Foreign Application Priority Data
Sep. 19, 2019    (GR) ............................... 20190100405

(51) Int. Cl.
*H04L 5/00*    (2006.01)
*H04B 7/06*    (2006.01)

(52) U.S. Cl.
CPC ......... *H04L 5/0057* (2013.01); *H04B 7/0626* (2013.01); *H04L 5/0023* (2013.01); *H04L 5/0064* (2013.01)

(58) Field of Classification Search
None
See application file for complete search history.

(56) References Cited

U.S. PATENT DOCUMENTS

| | | | |
|---|---|---|---|
| 9,848,351 B2 * | 12/2017 | Han | H04W 36/0061 |
| 2012/0201207 A1 * | 8/2012 | Liu | H04W 24/10 370/329 |
| 2012/0220286 A1 | 8/2012 | Chen et al. | |
| 2013/0114455 A1 * | 5/2013 | Yoo | H04L 1/0027 370/252 |
| 2014/0010126 A1 | 1/2014 | Sayana et al. | |
| 2014/0269383 A1 * | 9/2014 | He | H04J 11/00 370/252 |
| 2014/0286296 A1 * | 9/2014 | Tiirola | H04L 5/0044 370/329 |

(Continued)

FOREIGN PATENT DOCUMENTS

WO    2019138088 A1    7/2019

OTHER PUBLICATIONS

International Search Report and Written Opinion—PCT/US2020/070555—ISA/EPO—dated Dec. 21, 2020.

*Primary Examiner* — Phirin Sam
(74) *Attorney, Agent, or Firm* — Harrity & Harrity, LLP

(57) ABSTRACT

Various aspects of the present disclosure generally relate to wireless communication. In some aspects, a user equipment (UE) may identify, for an occasion of a resource of a physical channel, a collision of a first channel state information (CSI) report associated with a first target time period and a second CSI report a second target time period; prioritize one of the first CSI report or the second CSI report based at least in part on one or more prioritization criteria; and transmit the one of the first CSI report or the second CSI report based at least in part on prioritizing the one of the first CSI report or the second CSI report. Numerous other aspects are provided.

30 Claims, 9 Drawing Sheets

(56) References Cited

U.S. PATENT DOCUMENTS

| | | | |
|---|---|---|---|
| 2015/0215090 A1* | 7/2015 | Sayana | H04L 5/0035 370/329 |
| 2015/0327106 A1* | 11/2015 | Lee | H04W 52/0206 370/252 |
| 2016/0013900 A1* | 1/2016 | Lee | H04L 5/0053 370/328 |
| 2016/0212786 A1* | 7/2016 | Hwang | H04W 72/0413 |
| 2016/0218790 A1* | 7/2016 | Hwang | H04B 17/24 |
| 2019/0229780 A1* | 7/2019 | Kim | H04B 7/0643 |
| 2020/0136777 A1* | 4/2020 | He | H04L 5/0055 |

* cited by examiner

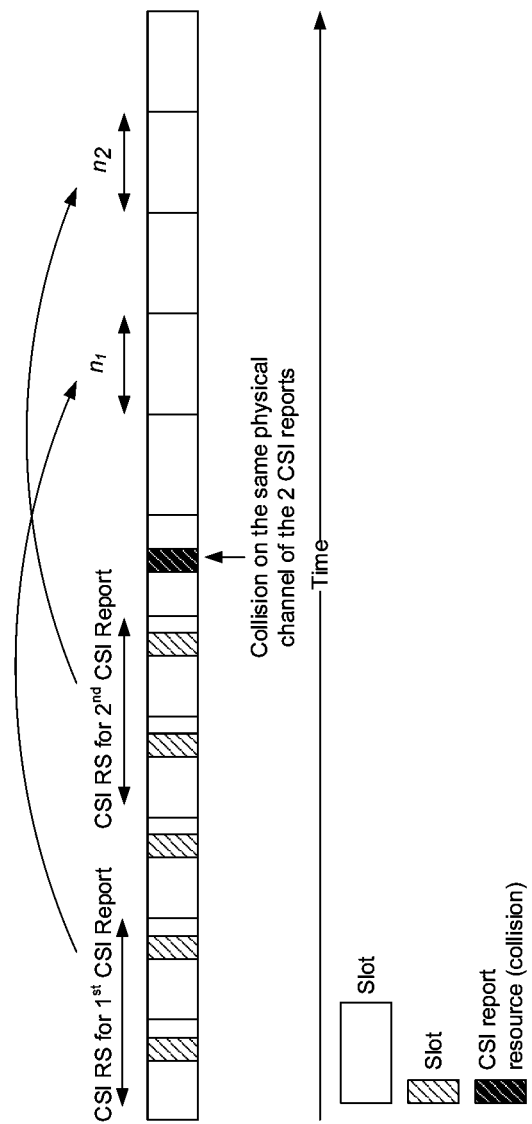

… (1) …

CHANNEL STATE INFORMATION REPORTING PRIORITIZATION

CROSS-REFERENCE TO RELATED APPLICATION

This Patent Application claims priority to Greece Patent Application No. 20190100405, filed on Sep. 19, 2019, entitled "CHANNEL STATE INFORMATION REPORTING PRIORITIZATION," and assigned to the assignee hereof. The disclosure of the prior Application is considered part of and is incorporated by reference into this Patent Application.

FIELD OF THE DISCLOSURE

Aspects of the present disclosure generally relate to wireless communication and more specifically, to techniques and apparatuses for channel state information reporting prioritization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A UE may perform a measurement of a channel state information (CSI) reference signal (RS) to determine information regarding a channel quality. The UE may provide a CSI report indicating a result of the CSI RS measurement to a BS. For example, the UE may provide information identifying the channel quality, a prediction of a channel quality at a subsequent time, an instruction regarding a parameter change that is determined based at least in part on the channel quality, among other examples. The UE may receive information allocating resources for transmitting the CSI report and may use the allocated resources to transmit the CSI report. However, in some cases, the UE may receive multiple CSI RSs that the UE is to report using the same resources. For example, the UE may determine that a time resource and a physical channel allocated for a first CSI report regarding a first CSI RS is the same time resource and the same physical channel as is allocated for a second CSI report regarding a second CSI RS.

SUMMARY

In some aspects, a method of wireless communication, performed by a user equipment (UE), may include identifying, for an occasion of a resource of a physical channel, a collision of a first channel state information (CSI) report including channel state information related to a first channel quality during a first target time period and a second CSI report including channel state information relating to a second channel quality during a second target time period, wherein the first target time period and the second target time period are time periods occurring after the occasion of the resource of the physical channel or an occasion of a reference signal that is used to derive the first CSI report or the second CSI report; prioritizing one of the first CSI report or the second CSI report based at least in part on one or more prioritization criteria; and transmitting the one of the first CSI report or the second CSI report based at least in part on prioritizing the one of the first CSI report or the second CSI report.

In some aspects, a UE for wireless communication may include memory and one or more processors operatively coupled to the memory. The memory and the one or more processors may be configured to identify, for an occasion of a resource of a physical channel, a collision of a first channel state information (CSI) report including channel state information related to a first channel quality during a first target time period and a second CSI report including channel state information relating to a second channel quality during a second target time period, wherein the first target time period and the second target time period are time periods occurring after the occasion of the resource of the physical channel or an occasion of a reference signal that is used to derive the first CSI report or the second CSI report; prioritize one of the first CSI report or the second CSI report based at least in part on one or more prioritization criteria; and transmit the one of the first CSI report or the second CSI report based at least in part on prioritizing the one of the first CSI report or the second CSI report.

In some aspects, a non-transitory computer-readable medium may store one or more instructions for wireless communication. The one or more instructions, when executed by one or more processors of a UE, may cause the one or more processors to: identify, for an occasion of a resource of a physical channel, a collision of a first channel state information (CSI) report including channel state information related to a first channel quality during a first target time period and a second CSI report including channel state information relating to a second channel quality during a second target time period, wherein the first target time period and the second target time period are time periods occurring after the occasion of the resource of the physical channel or an occasion of a reference signal that is used to derive the first CSI report or the second CSI report; prioritize one of the first CSI report or the second CSI report based at least in part on one or more prioritization criteria; and transmit the one of the first CSI report or the second CSI report based at least in part on prioritizing the one of the first CSI report or the second CSI report.

In some aspects, an apparatus for wireless communication may include means for identifying, for an occasion of a resource of a physical channel, a collision of a first channel state information (CSI) report including channel state information related to a first channel quality during a first target time period and a second CSI report including channel state information relating to a second channel quality during a second target time period, wherein the first target time period and the second target time period are time periods occurring after the occasion of the resource of the physical channel or an occasion of a reference signal that is used to derive the first CSI report or the second CSI report; means for prioritizing one of the first CSI report or the second CSI report based at least in part on one or more prioritization criteria; and means for transmitting the one of the first CSI report or the second CSI report based at least in part on prioritizing the one of the first CSI report or the second CSI report.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 4A-4D are diagrams illustrating examples of channel state information reporting prioritization according to various aspects of the present disclosure.

DETAILED DESCRIPTION

Figure 1:
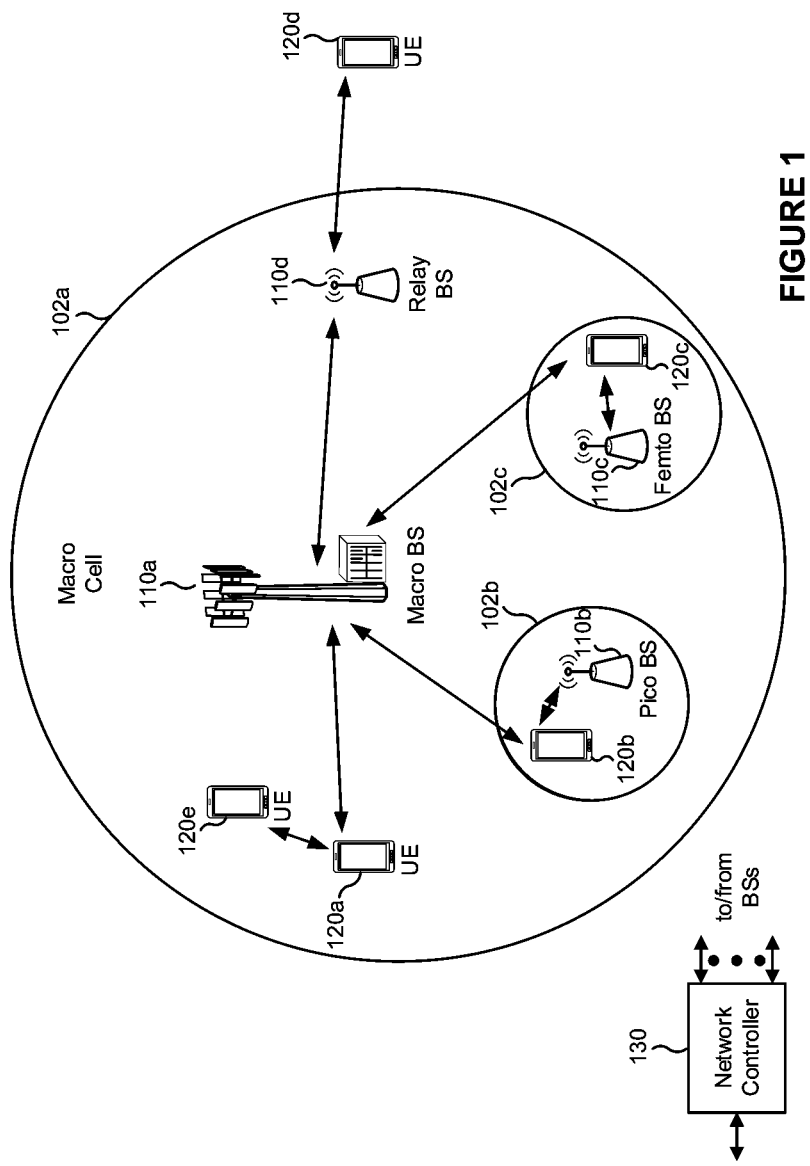
FIG. 1 is a block diagram illustrating an example wireless network according to various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

As a response to a request to report CSI, a UE may determine an allocated resource of a physical channel for transmitting a channel state information (CSI) report. However, in some cases, the UE may determine that the allocated resource is allocated for transmission of multiple CSI reports. Some aspects described herein enable CSI reporting prioritization. For example, the UE may prioritize a first CSI report or a second CSI report based at least in part on an order in which a first CSI RS and a second CSI RS are received.

In this way, the UE resolves conflicts between the first CSI report and the second CSI report, thereby ensuring that, for example, high priority communications are not dropped in a network. For example, the UE may ensure that CSI reporting for controlling a slot for which the UE is more likely to be allocated resources for communication is transmitted rather than CSI reporting for controlling a slot for which the UE is less likely to be allocated resources for communication, as described in more detail herein.

FIG. 1 is a block diagram illustrating an example wireless network according to various aspects of the present disclosure. The wireless network may be a Long Term Evolution (LTE) network or some other wireless network, such as a 5G or NR network. The wireless network may include a quantity of base stations (BSs) 110 (shown as BS 110*a*, BS 110*b*, BS 110*c*, and BS 110*d*) and other network entities. A BS is an entity that communicates with UE(s) and may also be referred to as a Node B, an eNodeB, an eNB, a gNB, a NR BS, a 5G node B (NB), an access point (AP), a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, among other examples, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move according to the location of a mobile BS. In some aspects, the BSs may be interconnected to one another or to one or more other BSs or network nodes (not shown) in the wireless network through various types of backhaul interfaces such as a direct physical connection, a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, among other examples, or combinations thereof.

UEs 120 (for example, 120*a*, 120*b*, 120*c*) may be dispersed throughout the wireless network, and each UE may be stationary or mobile. A UE may also be referred to as an access terminal, a terminal, a mobile station, a subscriber unit, a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, among other examples, or combinations thereof), a mesh network, among other examples, or combinations thereof In this case, the UE 120 may perform scheduling operations, resource selection operations, or other operations described elsewhere herein as being performed by the base station 110.

Figure 2:
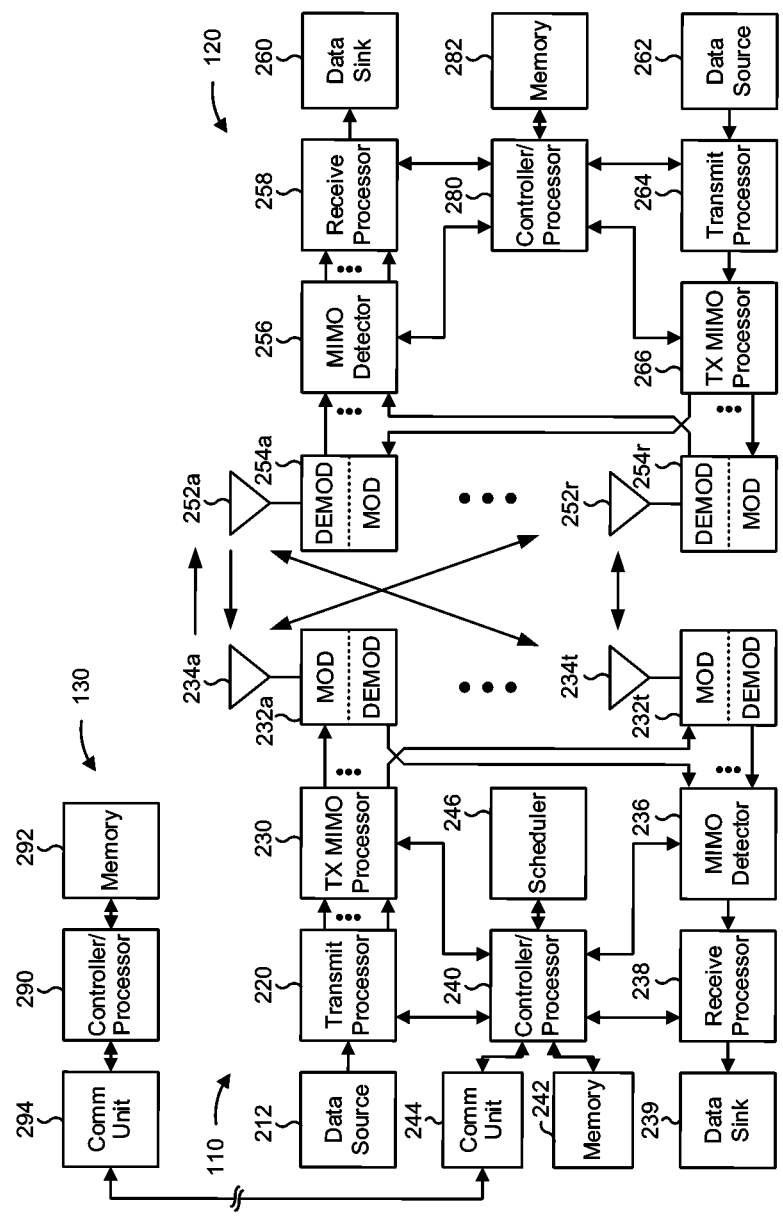
FIG. 2 is a block diagram illustrating an example base station (BS) in communication with a user equipment (UE) in a wireless network according to various aspects of the present disclosure.

FIG. 2 is a block diagram illustrating an example base station (BS) in communication with a user equipment (UE) in a wireless network according to various aspects of the present disclosure. Base station 110 may be equipped with T antennas 234*a* through 234*t,* and UE 120 may be equipped with R antennas 252*a* through 252*r,* where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples, or combinations thereof) and control information (for example, CQI requests, grants, upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM among other examples, or combinations thereof) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t,* respectively. According to various aspects described in more detail below, the synchronization signals can be generated with location encoding to convey additional information.

At UE 120, antennas 252*a* through 252*r* may receive the downlink signals from base station 110 or other base stations and may provide received signals to R demodulators (DEMODs) 254*a* through 254*r,* respectively. Each DEMOD 254 may condition (for example, filter, amplify, downconvert, and digitize) a received signal to obtain input samples. Each DEMOD 254 may further process the input samples (for example, for OFDM among other examples, or combinations thereof) to obtain received symbols. A MIMO detector 256 may obtain received symbols from all R DEMODs 254*a* through 254*r,* perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with CSI reporting prioritization, as described in more detail elsewhere herein. For example, controller/processor 240 of base station 110, controller/processor 280 of UE 120, or any other component(s) of FIG. 2 may perform or direct operations of, for example, the process of FIG. 5 or other processes as described herein. Memories 242 and 282 may store data and program codes for base station 110 and UE 120, respectively. A scheduler 246 may schedule UEs for data transmission on the downlink or uplink.

In some aspects, UE 120 may include means for identifying, for an occasion of a resource of a physical channel, a collision of a first channel state information (CSI) report including channel state information related to a first channel quality during a first target time period and a second CSI report including channel state information relating to a second channel quality during a second target time period, means for prioritizing one of the first CSI report or the second CSI report based at least in part on one or more prioritization criteria, means for transmitting the one of the first CSI report or the second CSI report based at least in part on prioritizing the one of the first CSI report or the second CSI report, among other examples, or combinations thereof. In some aspects, such means may include one or more components of UE 120 described in connection with FIG. 2.

As described above, as a response to a request to report CSI, a UE may determine an allocated resource of a physical channel for transmitting a CSI report. However, in some cases, the UE may determine that the allocated resource is allocated for transmission of multiple CSI reports. For example, the UE may receive a first set of CSI RSs that triggers a first CSI report, which is to include channel state information relating to a channel quality during a first target time period in the future. Further, the UE may receive a second set of CSI RSs that triggers a second CSI report, which is to include channel state information relating to a channel quality during a second target time period in the future. In such an example, the first CSI report and the second CSI report associated with the first and second target time periods, respectively, may be scheduled for the same time resource, which occurs before the first target time period and the second target time period, and the same physical channel resource.

Some aspects described herein enable CSI reporting prioritization. For example, the UE may prioritize a first CSI report or a second CSI report based at least in part on an order in which a first CSI RS and a second CSI RS is received. Additionally or alternatively, the UE may prioritize the first CSI RS or the second CSI RS based at least in part on an order in which the first target time period and the second target time period occurs. Additionally or alternatively, the UE may prioritize the first CSI RS or the second CSI RS based at least in part on a size of a time gap between the first CSI RS and the first target time period relative to a time gap between the second CSI RS and the second target time period. Additionally or alternatively, the UE may prioritize the first CSI RS or the second CSI RS based at least in part on a quantity of RSs being reported by the first CSI report relative to the second CSI report. Additionally or alternatively, the UE may prioritize the first CSI RS or the second CSI RS based at least in part on a timing behavior of the first CSI RS or the second CSI RS. Additionally or alternatively, the UE may prioritize the first CSI RS or the second CSI RS based at least in part on a plurality of prioritization criteria, such as an order of CSI RSs and a time gap between the respective CSI reports and the corresponding respective target time periods. By such techniques, the UE resolves conflicts between the first CSI report and the second CSI report, thereby ensuring that, for example, high priority communications are not dropped in a network.

FIGS. 3 and 4A-4D are diagrams illustrating examples of channel state information reporting prioritization according to various aspects of the present disclosure.

Figure 3:
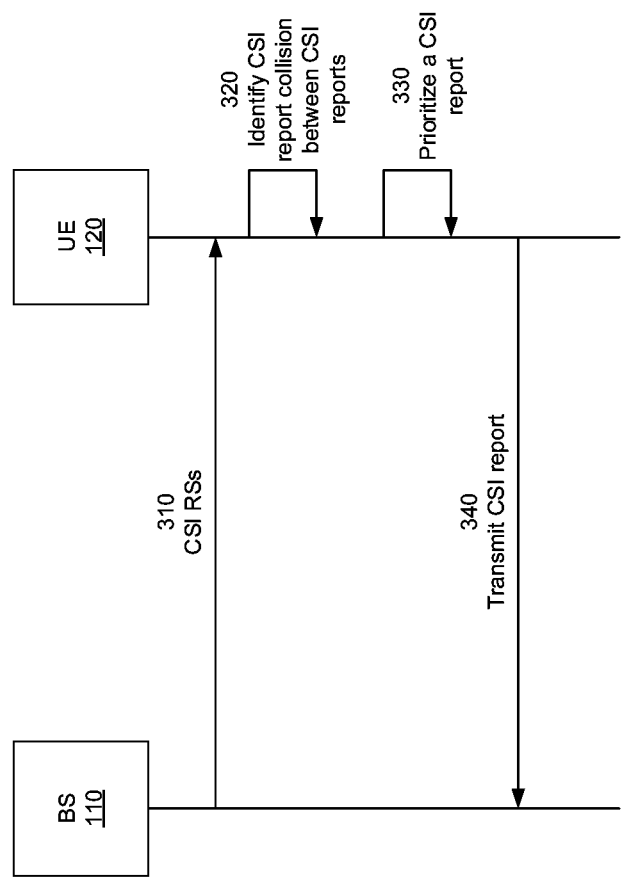
FIGS. 3 is a diagram illustrating an example of channel state information reporting prioritization according to various aspects of the present disclosure.

As shown in FIG. 3, a BS 110 may communicate with a UE 120. As further shown in FIG. 3, and in a first operation 310, UE 120 may receive a set of CSI RSs. For example, UE 120 may receive a first set of CSI RSs and may perform measurements of the first set of CSI RSs. In such an example, UE 120 may determine to transmit a first CSI report to identify the measurements of the first set of CSI RSs to enable control of one or more communication parameters for a first target time period. Additionally or alternatively, UE 120 may receive a second set of CSI RSs and may perform measurements of the second set of CSI RSs. In such an example, UE 120 may determine to transmit a second CSI report to identify measurements of the second set of CSI RSs to enable control of one or more communication parameters for a second target time period.

Figure 4B:
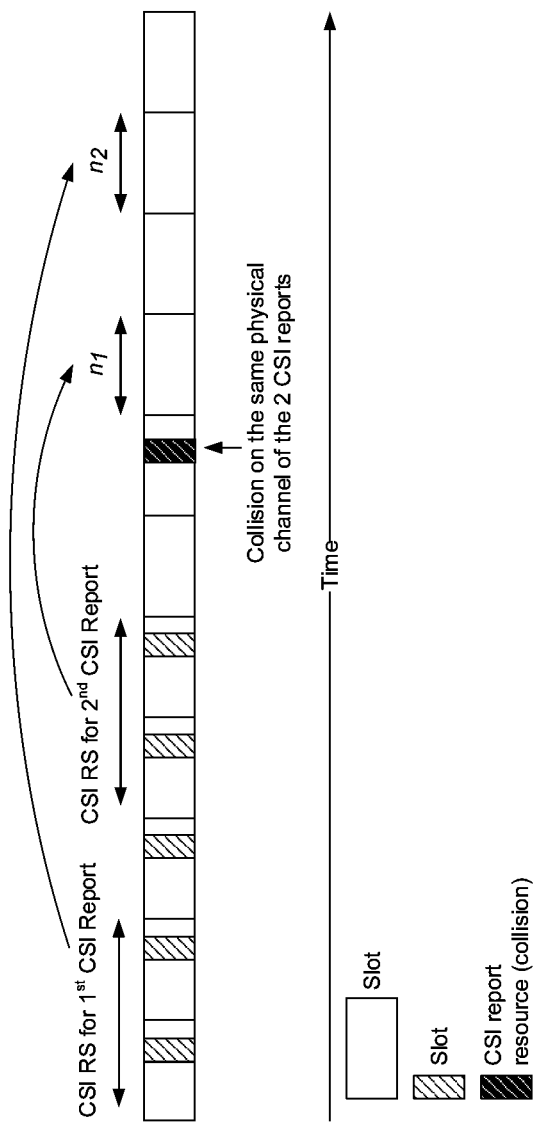

In the examples shown in FIGS. 4A and 4B, UE 120 may receive a two CSI RSs for measurement and reporting via a first CSI report and two CSI RSs for measurement and reporting via a second CSI report. In the example shown in FIG. 4C, UE 120 may receive three CSI RSs for measurement and reporting via the first CSI report and two CSI RSs for measurement and reporting via the second CSI report. In the example shown in FIG. 4D, UE 120 may receive two CSI RSs for measurement and reporting via the first CSI report and three CSI RSs for reporting via the second CSI report.

In some aspects, UE 120 may determine a target time period to which each CSI report is to relate. For example, UE 120 may determine to transmit the first and second CSI reports to enable control of communication parameters for respective slots. Additionally or alternatively, UE 120 may determine to transmit the first and second CSI reports to enable control of communication parameters for respective subframes. Additionally or alternatively, UE 120 may determine to transmit the first and second CSI reports to enable control of communication parameters for respective frames. Additionally or alternatively, UE 120 may determine to transmit the first and second CSI reports to enable control of communication parameters for respective orthogonal frequency division multiplexing (OFDM) symbols.

In some aspects, UE 120 may receive information allocating resources for the first CSI report or the second CSI report. For example, UE 120 may receive radio resource control (RRC) signaling or downlink control information (DCI) signaling indicating a time resource allocation for transmission of a CSI report. Additionally or alternatively, UE 120 may receive signaling identifying a physical channel resource allocation for transmission of a CSI report. In this case, UE 120 may receive signaling indicating the same time resource allocation and the same physical channel resource allocation.

Returning to FIG. 3, UE 120 may identify a CSI report collision in a second operation 320 and, in a third operation 330, UE 120 may prioritize a CSI report of the CSI reports that UE 120 identifies as colliding. For example, as illustrated in FIGS. 4A-4D, UE 120 may determine that the first CSI report and the second CSI report are scheduled for transmission using the same time resources and the same physical channel. In such examples, UE 120 may select the first CSI report or the second CSI report based at least part on one or more prioritization criteria. In some aspects, UE 120 may select a CSI report to prioritize (the first CSI report or the second CSI report) based at least in part on a single prioritization criterion. For example, UE 120 may select the second CSI report based at least in part on the second CSI report relating to second CSI RSs occurring after first CSI RSs relating to the first CSI report, as described in more detail herein. In some aspects, UE 120 may select a CSI report to prioritize (the first CSI report or the second CSI report) based on a multiple prioritization criteria. For example, BS 110 may determine whether the first CSI or second CSI is derived from a greater quantity of CSI RSs and may also determine whether the first CSI or the second CSI is associated with a smaller time gap to a corresponding target time period, as described herein.

In the example illustrated in FIG. 4A, UE 120 may select the second CSI report based at least in part on the second CSI report relating to a second target time period, n2, occurring after a first target time period, n1, relating to the first CSI report. In this way, when BS 110 transmits CSI RSs for the second CSI report after CSI RSs for the first CSI report, UE 120 prioritizes transmitting the second CSI report to ensure that BS 110 can schedule UE 120 in the second target time period, n2. Additionally or alternatively, UE 120 may prioritize transmitting the second CSI report based at least in part on the second CSI RSs for the second CSI report occurring after the first CSI RSs for the first CSI report.

Figure 4C:
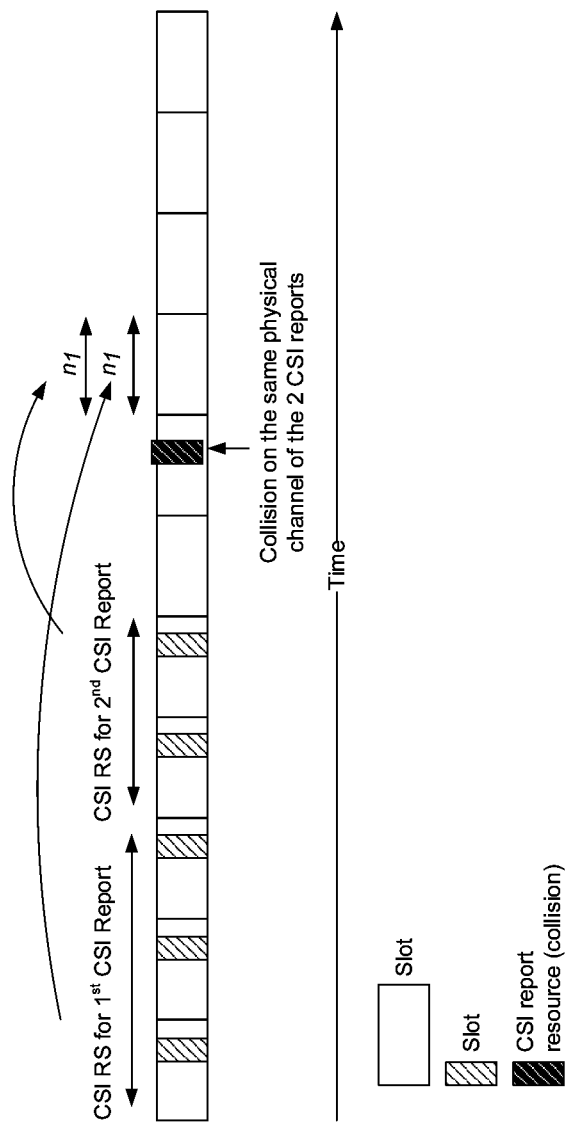

In another example, as illustrated in FIGS. 4B and 4C, UE 120 may select the second CSI report based at least in part on a time gap prioritization criterion. For example, UE 120 may determine that a first time gap between first CSI RSs for the first CSI report and the first target slot for the first CSI report is greater than a second time gap between second CSI RSs for the second CSI report and the second target slot for the second CSI report. In this case, UE 120 may select the second CSI report to prioritize for transmission based at least in part on the second CSI RSs being more proximate to the target time period for which communication parameters are to be controlled. In this way, UE 120 ensures that the transmitted CSI report represents a channel quality determination performed closest to target slots that are to be controlled.

Figure 4D:
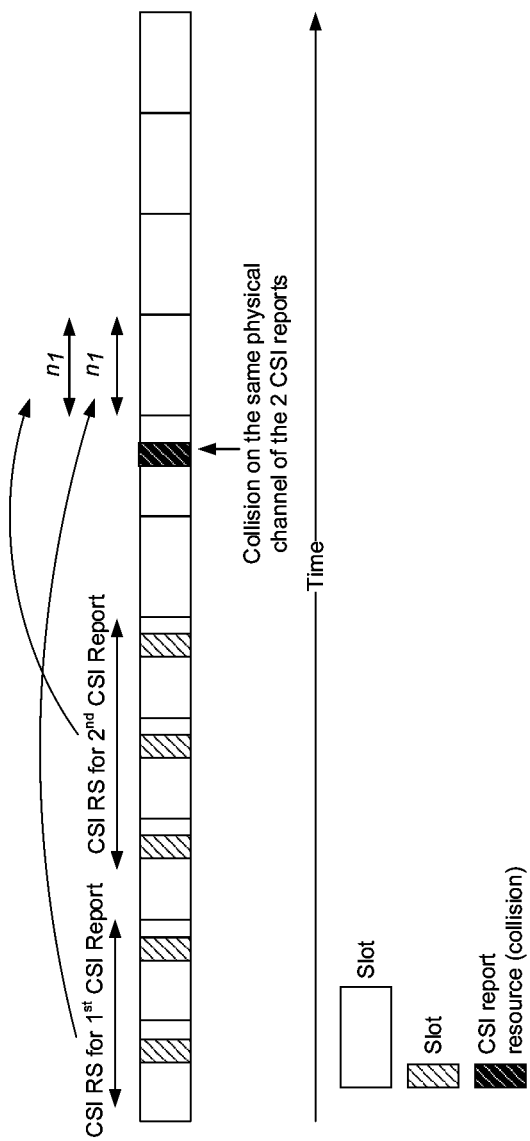

In another example, as illustrated in FIG. 4D, UE 120 may select the second CSI report to prioritize based at least in part on a quantity of CSI RSs for the second CSI report. For example, UE 120 may determine that the second CSI report is scheduled to be derived from more CSI RSs than the first CSI report and may select the second CSI report to prioritize for transmission based at least in part on the second CSI report being scheduled to be derived from more CSI RSs than the first CSI report. Additionally or alternatively, UE 120 may determine that the second CSI report is actually derived from more CSI RSs than the first CSI report and may select the second CSI report based at least in part on the second CSI report being actually derived from more CSI RSs than the first CSI report. For example, UE 120 may determine that the first CSI report is scheduled to be derived from more CSI RSs than the second CSI report. However, UE 120 may identify a collision between transmission of one or more of the first CSI RSs for the first CSI report and another channel resulting in dropping of these CSI RSs for the first CSI report. In this case, based at least in part on an actual quantity of received second CSI RSs for the second CSI report being greater than the quantity of received first CSI RSs for the first CSI report, UE 120 may select the second CSI report for transmission.

Returning back to FIG. 3, in a fourth operation 340, UE 120 may transmit a CSI report. For example, based at least in part on prioritizing a CSI report, UE 120 may transmit the prioritized CSI report. In some aspects, UE 120 may drop another CSI report, as described above. For example, when UE 120 selects the second CSI report based at least in part on one or more prioritization criteria, UE 120 may transmit the second CSI report and drop the first CSI report.

Figure 5:
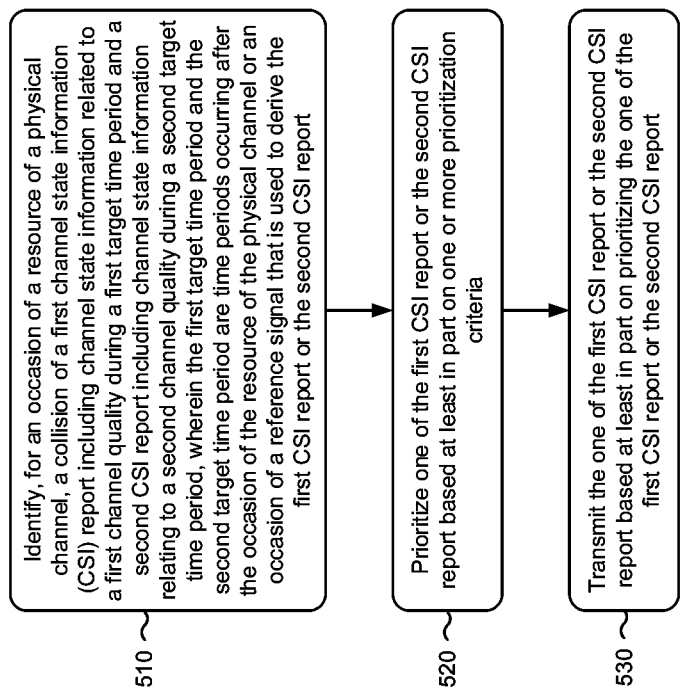
FIG. 5 is a diagram illustrating an example process performed by a UE according to various aspects of the present disclosure.

FIG. 5 is a diagram illustrating an example process 500 performed, for example, by a UE, according to various aspects of the present disclosure. For example, according to the process 500, a UE, such as UE 120, performs operations associated with channel state information reporting prioritization.

As shown in FIG. 5, in some aspects, the process may include identifying, for an occasion of a resource of a physical channel, a collision of a first CSI report including channel state information relating to a first channel quality during a first target time period and a second CSI report including channel state information relating to a second channel quality during a second target time period, wherein the first target time period and the second target time period are time periods occurring after the occasion of the resource of the physical channel or an occasion of a reference signal that is used to derive the first CSI report or the second CSI report (block 510). For example, the UE (using controller/processor 280 among other examples) may identify, for an occasion of a resource of a physical channel, a collision of a first CSI report including channel state information relating to a first channel quality during a first target time period and a second CSI report including channel state information relating to a second channel quality during a second target time period, as described above. In some aspects, the first target time period and the second target time period are time periods occurring after the occasion of the resource of the physical channel or an occasion of a reference signal that is used to derive the first CSI report or the second CSI report.

As further shown in FIG. 5, in some aspects, the process may include prioritizing one of the first CSI report or the second CSI report based at least in part on one or more prioritization criteria (block 520). For example, the UE (using controller/processor 280 among other examples) may prioritize one of the first CSI report or the second CSI report based at least in part on one or more prioritization criteria, as described above.

As further shown in FIG. 5, in some aspects, the process may include transmitting the one of the first CSI report or the second CSI report based at least in part on prioritizing the one of the first CSI report or the second CSI report (block 530). For example, the UE (using controller/processor 280, transmit processor 264, TX MIMO processor 266, MOD 254, antenna 252, among other examples) may transmit the one of the first CSI report or the second CSI report based at least in part on prioritizing the one of the first CSI report or the second CSI report, as described above.

The process of FIG. 5 may include additional aspects, such as any single aspect or any combination of aspects described below or in connection with one or more other processes described elsewhere herein.

In a first aspect, prioritizing the one of the first CSI report or the second CSI report includes prioritizing the one of the first CSI report or the second CSI report based at least in part on a quantity of reference signal resources of a reference signal associated with the one of the first CSI report or the second CSI report relative to a quantity of reference signal resources of a reference signal associated with the other of the first CSI report or the second CSI report.

In a second aspect, alone or in combination with the first aspect, prioritizing the one of the first CSI report or the second CSI report includes prioritizing the one of the first CSI report or the second CSI report based at least in part on two or more of: a timing of the first target time period relative to the second target time period, a timing of the first CSI report relative to a timing of the second CSI report, a timing behavior at least one of the first CSI report or the second CSI report, a time gap between the first CSI report and a first reference signal relative to a time gap between the second CSI report and a second reference signal, a time gap between the first CSI report and the first target time period relative to a time gap between the second CSI report and the second target time period, or a quantity of reference signal resources of a reference signal triggering the one of the first CSI report or the second CSI report relative to a quantity of reference signal resources of a reference signal triggering the other of the first CSI report or the second CSI report.

In a third aspect, alone or in combination with one or more of the first and second aspects, prioritizing the one of the first CSI report or the second CSI report includes prioritizing the one of the first CSI report or the second CSI report based at least in part on the first target time period and the second target time period occurring after the occasion of the resource of the physical channel or an occasion of a reference signal that is used to derive the first CSI report or the second CSI report.

In a fourth aspect, alone or in combination with one or more of the first through third aspects, the first target time period and the second target time period are, respectively, at least one of a first set of consecutive symbols and a second set of consecutive symbols, a first slot and a second slot, a first subframe and a second subframe, a first frame and a second frame, or a first symbol and a second symbol.

In a fifth aspect, alone or in combination with one or more of the first through fourth aspects, the first CSI report and the second CSI report are scheduled for transmission on an occasion of a resource of the physical channel in the same time domain resource.

In a sixth aspect, alone or in combination with one or more of the first through fifth aspects, identifying the collision includes identifying the collision based at least in part on determining that the first CSI report and the second CSI report are scheduled for transmission using the same time domain resource and the same physical channel.

In a seventh aspect, alone or in combination with one or more of the first through sixth aspects, prioritizing the one of the first CSI report or the second CSI report includes prioritizing the one of the first CSI report or the second CSI report based at least in part on a timing of the first target time period relative to the second target time period.

In an eighth aspect, alone or in combination with one or more of the first through seventh aspects, the one of the first CSI report or the second CSI report is associated with a later target time period than the other of the first CSI report or the second CSI report.

In a ninth aspect, alone or in combination with one or more of the first through eighth aspects, prioritizing the one of the first CSI report or the second CSI report includes prioritizing the one of the first CSI report or the second CSI report based at least in part on a timing of the one of the first CSI report or the second CSI report relative to a timing of the other of the first CSI report or the second CSI report.

In a tenth aspect, alone or in combination with one or more of the first through ninth aspects, the one of the first CSI report or the second CSI report is later than the other of the first CSI report or the second CSI report.

In an eleventh aspect, alone or in combination with one or more of the first through tenth aspects, prioritizing the one of the first CSI report or the second CSI report includes prioritizing the one of the first CSI report or the second CSI report based at least in part a timing behavior of at least one of the first CSI report or the second CSI report.

In a twelfth aspect, alone or in combination with one or more of the first through eleventh aspects, the timing behavior of at least one of the first CSI report or the second CSI report is an aperiodic timing behavior, a periodic timing behavior, or a semi-persistent timing behavior.

In a thirteenth aspect, alone or in combination with one or more of the first through twelfth aspects, prioritizing the one of the first CSI report or the second CSI report includes prioritizing the one of the first CSI report or the second CSI report based at least in part on a first time proximity of the one of the first CSI report or the second CSI report to a corresponding one of the first target time period or the second target time period relative to a second time proximity of the other of the first CSI report or the second CSI report to the corresponding other of the first target time period or the second target time period.

In a fourteenth aspect, alone or in combination with one or more of the first through thirteenth aspects, the first time proximity is a first time gap between a timing of a first CSI reference signal (RS) resource associated one of the first CSI report or the second CSI report and a corresponding timing of the first target time period or the second target time period, and the second time proximity is a second time gap between a timing of a second CSI RS resource associated with the other of the first CSI report or the second CSI report and a corresponding timing of the first target time period or the second target time period.

In a fifteenth aspect, alone or in combination with one or more of the first through fourteenth aspects, prioritizing the one of the first CSI report or the second CSI report includes prioritizing a subset of the first CSI report or a subset of the second CSI report; and transmitting the one of the first CSI report or the second CSI report includes transmitting the subset of the first CSI report or the subset of the second CSI report.

Figure 6:
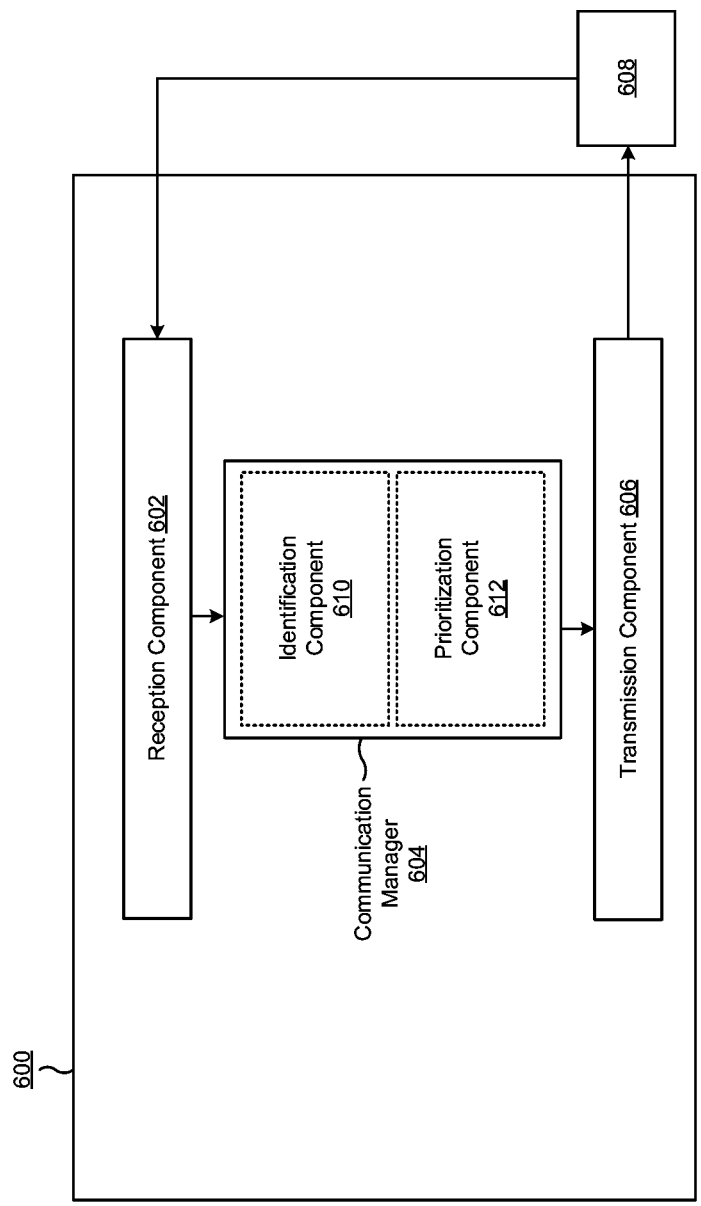
FIG. 6 is a diagram illustrating an example apparatus according to various aspects of the present disclosure.

FIG. 6 is a block diagram of an example apparatus 600 for wireless communication in accordance with various aspects of the present disclosure. The apparatus 600 may be a UE, or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIGS. 3-4D. Additionally or alternatively, the apparatus 600 may be configured to perform one or more processes described herein, such as process 500 of FIG. 5, among other examples. In some aspects, the apparatus 600 may include one or more components of the UE described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 2. In some aspects, the transmission component 606 may be co-located with the reception component 602 in a transceiver.

The communication manager 604 may perform operations associated with channel state information prioritization. In some aspects, the communication manager 604 may include a controller/processor, a memory, a scheduler, a communication unit, or a combination thereof, of the UE described above in connection with FIG. 2.

In some aspects, the communication manager 604 may include a set of components, such as an identification component 610, a prioritization component 612, or a combination thereof. Alternatively, the set of components may be separate and distinct from the communication manager 604. In some aspects, one or more components of the set of components may include or may be implemented within a controller/processor, a memory, a scheduler, a communication unit, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The identification component 610 may identify, for an occasion of a resource of a physical channel, a collision of a first CSI report including channel state information related to a first channel quality during a first target time period and a second CSI report including channel state information relating to a second channel quality during a second target time period, wherein the first target time period and the second target time period are time periods occurring after the occasion of the resource of the physical channel or an occasion of a reference signal that is used to derive the first CSI report or the second CSI report. The prioritization component 612 may prioritize one of the first CSI report or the second CSI report based at least in part on one or more prioritization criteria, such as based at least in part on a timing of the first target time period relative to the second target time period, a timing of the first CSI report relative to a timing of the second CSI report, a timing behavior at least one of the first CSI report or the second CSI report, a time gap between the first CSI report and a first reference signal relative to a time gap between the second CSI report and a second reference signal, a time gap between the first CSI report and the first target time period relative to a time gap between the second CSI report and the second target time period, or a quantity of reference signal resources of a reference signal triggering the one of the first CSI report or the second CSI report relative to a quantity of reference signal resources of a reference signal triggering the other of the first CSI report or the second CSI report, among other examples.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, among other examples, or combinations thereof), and may be used interchangeably with "one or more." Where only one item is intended, the phrase "only one" or similar language is used. Also, as used herein, the terms "has," "have," "having," among other examples, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying, for an occasion of a resource of a physical channel, a collision of a first channel state information (CSI) report and a second CSI report, the first CSI report including CSI related to a first channel quality during a first target time period and the second CSI report including CSI relating to a second channel quality during a second target time period,
      wherein the first target time period and the second target time period are time periods occurring after the occasion of the resource of the physical channel or an occasion of a reference signal that is used to derive the first CSI report or the second CSI report;
   prioritizing one of the first CSI report or the second CSI report based at least in part on one or more prioritization criteria; and
   transmitting the one of the first CSI report or the second CSI report based at least in part on prioritizing the one of the first CSI report or the second CSI report.

2. The method of claim 1, wherein prioritizing the one of the first CSI report or the second CSI report comprises prioritizing a subset of the first CSI report or a subset of the second CSI report; and wherein transmitting the one of the first CSI report or the second CSI report comprises transmitting the subset of the first CSI report or the subset of the second CSI report.

3. The method of claim 1, wherein prioritizing the one of the first CSI report or the second CSI report comprises prioritizing the one of the first CSI report or the second CSI report based at least in part on the first target time period and the second target time period occurring after the occasion of the resource of the physical channel or the occasion of the reference signal that is used to derive the first CSI report or the second CSI report.

4. The method of claim 1, wherein the first target time period and the second target time period are, respectively, at least one of:
a first set of consecutive symbols and a second set of consecutive symbols,
a first slot and a second slot,
a first subframe and a second subframe,
a first frame and a second frame, or
a first symbol and a second symbol.

5. The method of claim 1, wherein the first CSI report and the second CSI report are scheduled for transmission on the occasion of the resource of the physical channel in the same time domain resource.

6. The method of claim 5, wherein identifying the collision comprises identifying the collision based at least in part on determining that the first CSI report and the second CSI report are scheduled for transmission using the same time domain resource and the same physical channel.

7. The method of claim 1, wherein prioritizing the one of the first CSI report or the second CSI report comprises prioritizing the one of the first CSI report or the second CSI report based at least in part on a timing of the first target time period relative to the second target time period.

8. The method of claim 7, wherein the one of the first CSI report or the second CSI report is associated with a later target time period than the other of the first CSI report or the second CSI report.

9. The method of claim 1, wherein prioritizing the one of the first CSI report or the second CSI report comprises prioritizing the one of the first CSI report or the second CSI report based at least in part on a timing of the one of the first CSI report or the second CSI report relative to a timing of the other of the first CSI report or the second CSI report.

10. The method of claim 9, wherein the one of the first CSI report or the second CSI report is later than the other of the first CSI report or the second CSI report.

11. The method of claim 1, wherein prioritizing the one of the first CSI report or the second CSI report comprises prioritizing the one of the first CSI report or the second CSI report based at least in part a timing behavior of at least one of the first CSI report or the second CSI report.

12. The method of claim 11, wherein the timing behavior of at least one of the first CSI report or the second CSI report is an aperiodic timing behavior, a periodic timing behavior, or a semi-persistent timing behavior.

13. The method of claim 1, wherein prioritizing the one of the first CSI report or the second CSI report comprises prioritizing the one of the first CSI report or the second CSI report based at least in part on a first time proximity of the one of the first CSI report or the second CSI report to a corresponding one of the first target time period or the second target time period relative to a second time proximity of the other of the first CSI report or the second CSI report to the corresponding other of the first target time period or the second target time period.

14. The method of claim 13, wherein the first time proximity is a first time gap between a timing of a first CSI reference signal (RS) resource associated one of the first CSI report or the second CSI report and a corresponding timing of the first target time period or the second target time period, and
the second time proximity is a second time gap between a timing of a second CSI RS resource associated with the other of the first CSI report or the second CSI report and a corresponding timing of the first target time period or the second target time period.

15. The method of claim 13, wherein prioritizing the one of the first CSI report or the second CSI report comprises prioritizing the one of the first CSI report or the second CSI report based at least in part on a quantity of reference signal resources of a reference signal associated with the one of the first CSI report or the second CSI report relative to a quantity of reference signal resources of a reference signal associated with the other of the first CSI report or the second CSI report.

16. The method of claim 1, wherein prioritizing the one of the first CSI report or the second CSI report comprises prioritizing the one of the first CSI report or the second CSI report based at least in part on two or more of: a timing of the first target time period relative to the second target time period, a timing of the first CSI report relative to a timing of the second CSI report, a timing behavior at least one of the first CSI report or the second CSI report, a time gap between the first CSI report and a first reference signal relative to a time gap between the second CSI report and a second reference signal, a time gap between the first CSI report and the first target time period relative to a time gap between the second CSI report and the second target time period, or a quantity of reference signal resources of a reference signal triggering the one of the first CSI report or the second CSI report relative to a quantity of reference signal resources of a reference signal triggering the other of the first CSI report or the second CSI report.

17. A user equipment (UE) for wireless communication, comprising:
a memory; and
one or more processors coupled to the memory, configured to:
identify, for an occasion of a resource of a physical channel, a collision of a first channel state information (CSI) report and a second CSI report, the first CSI report including CSI related to a first channel quality during a first target time period and the second CSI report including CSI relating to a second channel quality during a second target time period, wherein the first target time period and the second target time period are time periods occurring after the occasion of the resource of the physical channel or an occasion of a reference signal that is used to derive the first CSI report or the second CSI report;
prioritize one of the first CSI report or the second CSI report based at least in part on one or more prioritization criteria; and
transmit the one of the first CSI report or the second CSI report based at least in part on prioritizing the one of the first CSI report or the second CSI report.

18. The UE of claim 17, wherein the one or more processors, when prioritizing the one of the first CSI report or the second CSI report, are to prioritize a subset of the first CSI report or a subset of the second CSI report; and wherein the one or more processors, when transmitting the one of the first CSI report or the second CSI report, are to transmit the subset of the first CSI report or the subset of the second CSI report.

19. The UE of claim 17, wherein the one or more processors, when prioritizing the one of the first CSI report or the second CSI report, are to prioritize the one of the first CSI report or the second CSI report based at least in part on the first target time period and the second target time period occurring after the occasion of the resource of the physical channel or the occasion of the reference signal that is used to derive the first CSI report or the second CSI report.

20. The UE of claim 17, wherein the first target time period and the second target time period are, respectively, at least one of:
   a first set of consecutive symbols and a second set of consecutive symbols,
   a first slot and a second slot,
   a first subframe and a second subframe,
   a first frame and a second frame, or
   a first symbol and a second symbol.

21. The UE of claim 17, wherein the first CSI report and the second CSI report are scheduled for transmission on the occasion of the resource of the physical channel in the same time domain resource.

22. The UE of claim 21, wherein the one or more processors, when identifying the collision, are to identify the collision based at least in part on determining that the first CSI report and the second CSI report are scheduled for transmission using the same time domain resource and the same physical channel.

23. The UE of claim 17, wherein the one or more processors, when prioritizing the one of the first CSI report or the second CSI report, are to prioritize the one of the first CSI report or the second CSI report based at least in part on a timing of the first target time period relative to the second target time period.

24. The UE of claim 23, wherein the one of the first CSI report or the second CSI report is associated with a later target time period than the other of the first CSI report or the second CSI report.

25. The UE of claim 17, wherein the one or more processors, when prioritizing the one of the first CSI report or the second CSI report, are to prioritize the one of the first CSI report or the second CSI report based at least in part on a timing of the one of the first CSI report or the second CSI report relative to a timing of the other of the first CSI report or the second CSI report.

26. The UE of claim 25, wherein the one of the first CSI report or the second CSI report is later than the other of the first CSI report or the second CSI report.

27. The UE of claim 17, wherein the one or more processors, when prioritizing the one of the first CSI report or the second CSI report, are to prioritize the one of the first CSI report or the second CSI report based at least in part a timing behavior of at least one of the first CSI report or the second CSI report.

28. The UE of claim 27, wherein the timing behavior of at least one of the first CSI report or the second CSI report is an aperiodic timing behavior, a periodic timing behavior, or a semi-persistent timing behavior.

29. A non-transitory computer-readable medium storing one or more instructions for wireless communication, the one or more instructions comprising:
   one or more instructions that, when executed by one or more processors of a user equipment (UE), cause the one or more processors to:
      identify, for an occasion of a resource of a physical channel, a collision of a first channel state information (CSI) report and a second CSI report, the first CSI report including CSI related to a first channel quality during a first target time period and the second CSI report including CSI relating to a second channel quality during a second target time period,
         wherein the first target time period and the second target time period are time periods occurring after the occasion of the resource of the physical channel or an occasion of a reference signal that is used to derive the first CSI report or the second CSI report;
      prioritize one of the first CSI report or the second CSI report based at least in part on one or more prioritization criteria; and
      transmit the one of the first CSI report or the second CSI report based at least in part on prioritizing the one of the first CSI report or the second CSI report.

30. An apparatus for wireless communication, comprising:
   means for identifying, for an occasion of a resource of a physical channel, a collision of a first channel state information (CSI) report and a second CSI report, the first CSI report including CSI related to a first channel quality during a first target time period and the second CSI report including CSI relating to a second channel quality during a second target time period,
      wherein the first target time period and the second target time period are time periods occurring after the occasion of the resource of the physical channel or an occasion of a reference signal that is used to derive the first CSI report or the second CSI report;
   means for prioritizing one of the first CSI report or the second CSI report based at least in part on one or more prioritization criteria; and
   means for transmitting the one of the first CSI report or the second CSI report based at least in part on prioritizing the one of the first CSI report or the second CSI report.

* * * * *